US012087293B2

(12) United States Patent
Wu et al.

(10) Patent No.: US 12,087,293 B2
(45) Date of Patent: Sep. 10, 2024

(54) SMART VOICE WAKE-UP CONTROL METHOD AND CONTROL DEVICE THEREOF

(71) Applicants: Dongguan Well Shin Electronic Products Co., Ltd., Guangdong (CN); WELL SHIN TECHNOLOGY CO., LTD., Taipei (TW)

(72) Inventors: Jui Hsiung Wu, Taipei (TW); Chun Xi Ju, Guangdong (CN)

(73) Assignees: Dongguan Well Shin Electronic Products Co., Ltd., Guangdong (CN); WELL SHIN TECHNOLOGY CO., LTD., Taipei (TW)

( * ) Notice: Subject to any disclaimer, the term of this patent is extended or adjusted under 35 U.S.C. 154(b) by 272 days.

(21) Appl. No.: 17/572,451

(22) Filed: Jan. 10, 2022

(65) Prior Publication Data

US 2022/0238106 A1    Jul. 28, 2022

(30) Foreign Application Priority Data

Jan. 28, 2021    (CN) .......................... 202110115864.8

(51) Int. Cl.
*G10L 15/22*    (2006.01)
*G08B 5/36*    (2006.01)
(Continued)

(52) U.S. Cl.
CPC ................ *G10L 15/22* (2013.01); *G08B 5/36* (2013.01); *G10L 15/08* (2013.01); *H01R 13/665* (2013.01);
(Continued)

(58) Field of Classification Search
CPC ......... G10L 15/22; G10L 15/00; G10L 15/06; G10L 15/065; G10L 15/08; G10L 15/086;
(Continued)

(56) References Cited

U.S. PATENT DOCUMENTS

2012/0228954 A1    9/2012    Kesler et al.
2014/0376747 A1*  12/2014    Mullet ................... G08C 23/00
                                                        381/110
2016/0330042 A1   11/2016    Andersen

FOREIGN PATENT DOCUMENTS

CN         1256529 A   *  6/2000  ............. H01R 13/66
CN       201781110 U   *  3/2011  ............. H01R 13/46
(Continued)

OTHER PUBLICATIONS

Europe Patent Office, Sear Report with Written Opinion, Patent Application No. EP22150715, May 6, 2022.
(Continued)

*Primary Examiner* — Qi Han
(74) *Attorney, Agent, or Firm* — Lin & Associates Intellectual Property, Inc.

(57) ABSTRACT

The invention discloses a smart voice wake-up control method and a control device thereof. The smart voice wake-up control device includes a casing, a main control board, a control switch, a voice pickup, a relay, an output terminal, an input terminal and a work indicator capable of emitting multiple colors of light, the main control board is respectively connected with the control switch, the voice pickup, the relay and the work indicator, and the relay is respectively connected with the output terminal and the input terminal. When multiple smart voice wake-up control devices are used simultaneously, the user can change the light color of the work indicator by controlling the control switch to distinguish different colors of voice wake-up commands, i.e., use the light color of the work indicator to show the color wake-up voice, so that the user can get the wake-up commands intuitively and quickly for controlling.

4 Claims, 3 Drawing Sheets

(51) Int. Cl.
  *G10L 15/08* (2006.01)
  *H01R 13/66* (2006.01)
  *H01R 13/70* (2006.01)
  *H01R 13/717* (2006.01)
  *H05B 47/12* (2020.01)
  *H01R 27/00* (2006.01)

(52) U.S. Cl.
  CPC ........... *H01R 13/70* (2013.01); *H01R 13/717* (2013.01); *H05B 47/12* (2020.01); *G10L 2015/088* (2013.01); *G10L 2015/223* (2013.01); *H01R 27/00* (2013.01)

(58) Field of Classification Search
  CPC ... G10L 15/18; G10L 15/1822; G10L 15/183; G10L 15/20; G10L 15/26; G10L 2015/0631–0638; G10L 2015/221–228
  USPC .... 704/275, 270.1, 270, 231, 243, 246, 250, 704/257
  See application file for complete search history.

(56) References Cited

FOREIGN PATENT DOCUMENTS

| | | | |
|---|---|---|---|
| CN | 206250518 U | 6/2017 | |
| CN | 108390670 A | 8/2018 | |
| CN | 111952795 A | 11/2020 | |
| CN | 212117406 U | * 12/2020 | ............. G10L 15/22 |
| EP | 3757753 A1 | 12/2020 | |
| TW | 201701605 A | 1/2017 | |

OTHER PUBLICATIONS

Taiwan Patent Office, Office Action, Patent Application No. TW111102765, Sep. 26, 2022.

* cited by examiner

SMART VOICE WAKE-UP CONTROL METHOD AND CONTROL DEVICE THEREOF

BACKGROUND OF THE INVENTION

1. Field of the Invention

The present invention relates generally to the technical field of smart home control, and specifically relates to a smart voice wake-up control method and a control device thereof.

2. The Prior Arts

The Chinese Patent No. "CN206250518U" discloses a smart socket, including the socket body, which is called a socket module, and also includes a voice collection part, which includes a voice collection module and a voice recognition module. The voice collection module can collect the user's voice signal, and the voice recognition module recognizes the voice signal, and performs corresponding voice control according to the recognized sound signal. The solution for the on-off control of the smart socket by the user through voice commands is: when the user sends out a voice signal, the voice signal is collected by the voice collection module, and the voice recognition module recognizes the user's voice signal. In a specific operation, the configured sentence can be written into the single-chip microcomputer in the form of a string. If the received string is the same as the configured string, the single-chip microcomputer controls the electronic switch to perform the power-on action. When the user says "on", the single-chip microcomputer can give a high level signal to the relay connected to it, so that the relay is closed and the electrical appliances connected to the socket are energized; on the contrary, when the user says "off", the relay is disconnected and the appliance is powered off. In addition, other actions can be performed only after the user speaks the first-level command and matches the voice recognition module. The first-level command refers to a specific command, such as "turn on the TV", "power on the washing machine", and so on.

Although realizing the voice control, the above technique needs to pre-record and store all the first-level commands through the voice recognition module. Not only is the workload large, the cost is high, but there are many types of household products that may be called differently in various regions; thence, it is difficult to achieve a fully adapted naming system to all household products and meets the individual needs of users. In addition, when multiple identical socket modules are installed in the same space, multiple electrical products of the same type or of different types will be powered off or energized at the same time when used, which may easily cause misoperation and interference, failing to meet the convenience of the smart application and leading to poor user experience.

SUMMARY OF THE INVENTION

In view of the foregoing shortcomings, a primary objective of the present invention is to provide a smart voice wake-up control method that is easy to implement and simple to operate.

Another objective of the present invention is to provide a smart voice wake-up control device with a simple structure and avoiding misoperation.

In order to achieve the above objectives, the technical solution provided by the present invention is:

A smart voice wake-up control method, which includes the following steps:

(1) Setting a command light color;
(2) A main control board matching a corresponding color voice wake-up command according to the command light color;
(3) During operation, the main control board controlling a work indicator to emit the command light color set in step (1), and at the same time receiving a user's control voice command through a voice pickup;
(4) The main control board recognizing the user's control voice command; if the control voice command containing the corresponding color wake-up voice, executing an output control command according to the user's control voice command, and triggering other functional devices to respond; otherwise, not executing the output control command.

As an improvement of the present invention, the command light color includes red, green, blue, yellow and other colors.

As an improvement of the present invention, the main control board matches the red, green, blue, and yellow colors of the command light with red voice wake-up commands, green voice wake-up commands, blue voice wake-up commands, yellow voice wake-up commands, and voice wake-up commands for other colors.

As an improvement of the present invention, the user's control voice command includes the voices of red, green, blue, and yellow.

A smart voice wake-up control device, which includes a casing, a main control board, a control switch, a voice pickup, a relay, an output terminal, an input terminal, and a work indicator light capable of emitting multiple colors of light; the main control board is respectively connected to the control switch, the voice pickup, the relay, and the work indicator, and the relay is respectively connected to the output terminal and the input terminal; the color of the light emitted by the work indicator corresponds to the color wake-up voice of the main control board.

As an improvement of the present invention, the main control board includes a microprocessor (MCU), and an AC/DC conversion module, a setting module, a voice module, a lighting control module, and a switch control module respectively connected to the MCU; the MCU is a CI1103 chip.

As an improvement of the present invention, the control switch is a touch switch, which is more convenient to control.

As an improvement of the present invention, the casing includes a face shell and a bottom cover matching the face shell, the input terminal is a male terminal, and one end of the male terminal is fixed on the bottom cover; the output terminal is a female terminal, the female terminal is fixed on the main control board, and a jack corresponding to the female terminal is provided on the face shell.

As an improvement of the present invention, a light hole corresponding to the work indicator and a sound hole corresponding to the voice pickup are provided on the face shell.

The beneficial effects of the present invention are: the smart voice wake-up control method provided by the present invention is easy to implement. During operation, the work indicator emits a preset color and matches the corresponding color voice wake-up command, and the user only needs to see the color to quickly determine and know the corresponding color voice wake-up command, which is simple and convenient to operate; when multiple devise are in simultaneous use, the user can change the light color of the working indicator through the control switch to distinguish different color voice wake-up commands, that is, using the light color of the indicator light to show the color wake-up voice, allowing users to get the wake-up commands intuitively and quickly, and facilitate the control, effectively solving the misoperation or interference problem of multiple electrical products of the same or different types in the same space used simultaneously. Therefore, the present invention brings convenience to user's operation and effectively improves the user experience. The smart voice wake-up control device provided by the present invention has a simple structure, low cost, easy implementation, and is beneficial to wide promotion and application.

The present invention will be further described below in conjunction with the drawings and embodiments.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
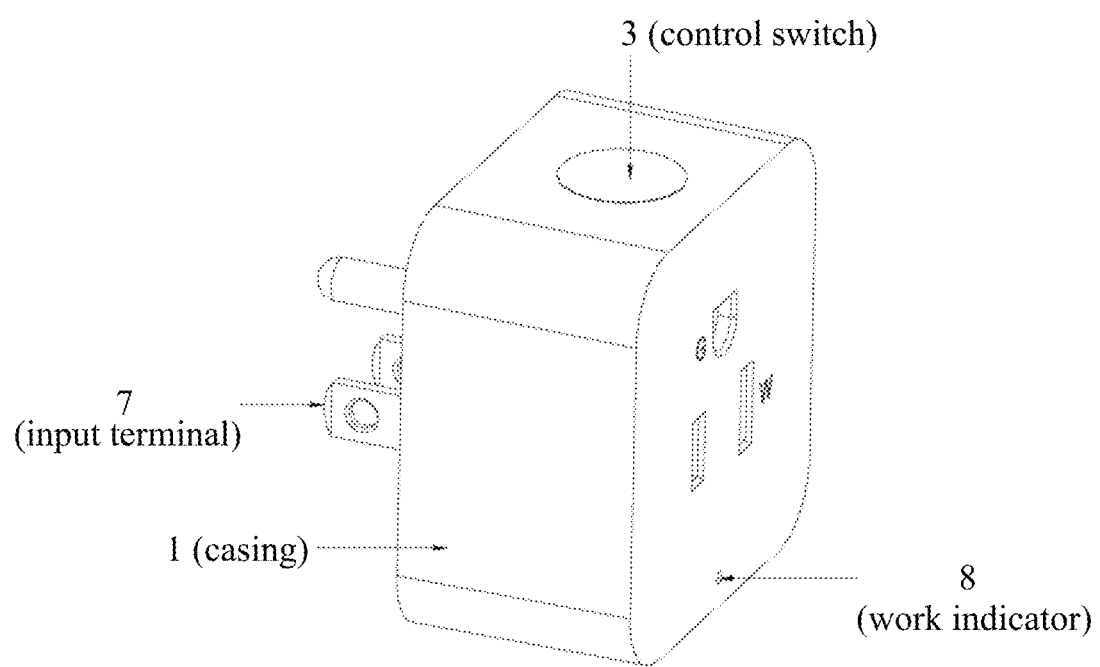
FIG. 1 is a schematic view of the three-dimensional structure of the smart voice wake-up control device of the present invention.
Figure 2:
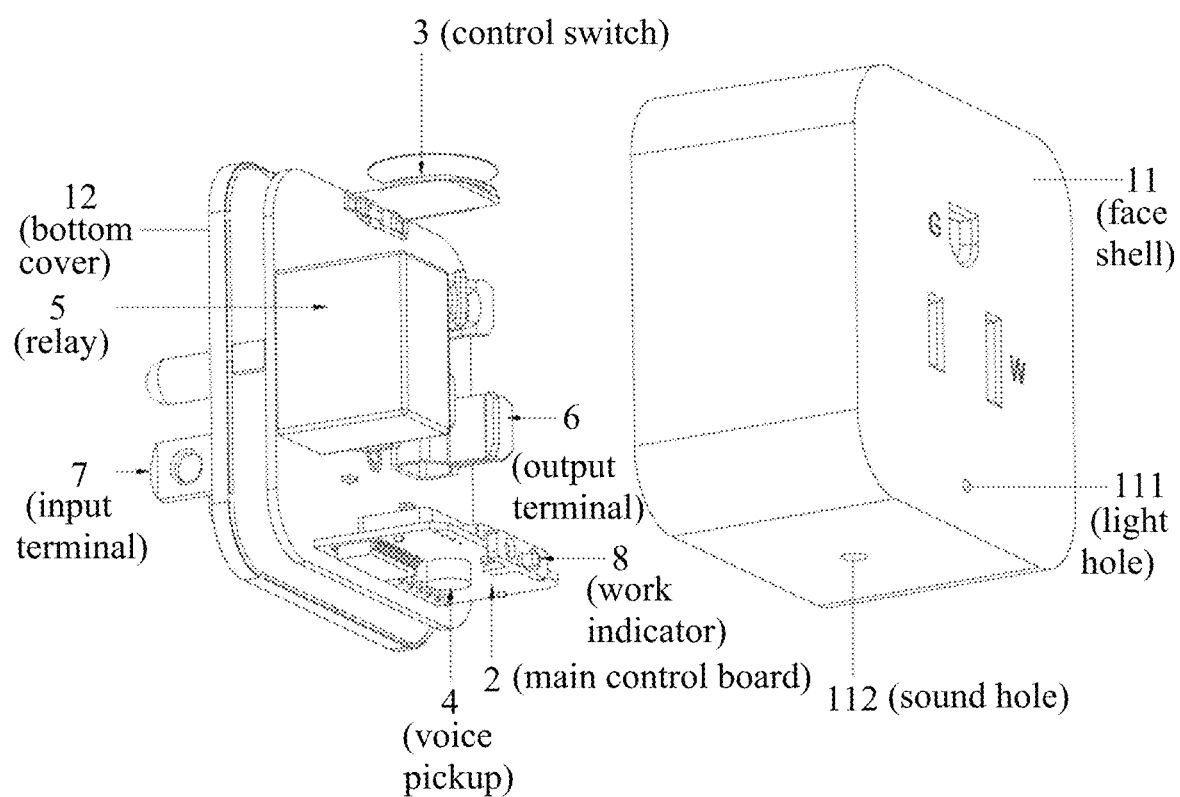
FIG. 2 is a schematic view of an exploded structure of the smart voice wake-up control device of the present invention.
Figure 3:
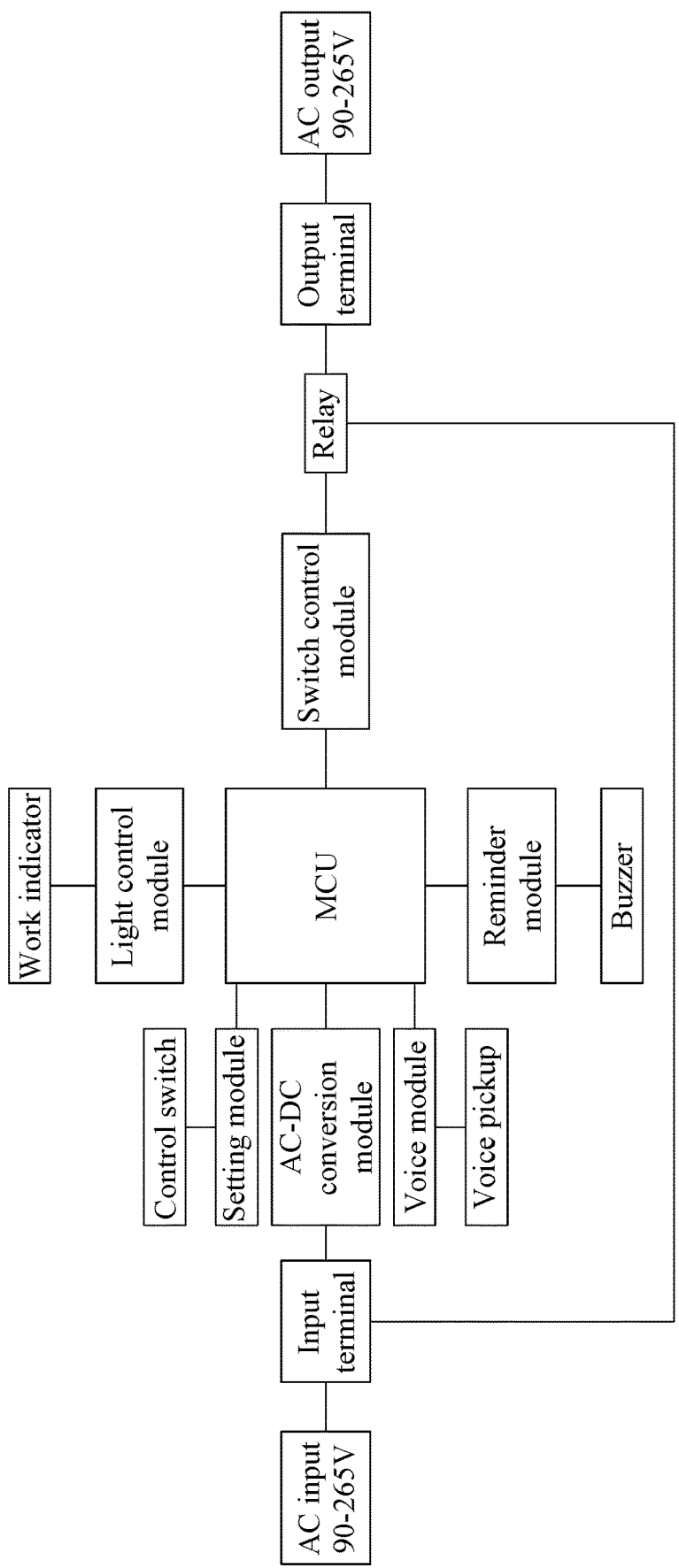
FIG. 3 is a block diagram showing the circuit structure of the smart voice wake-up control device of the present invention.

Embodiment: referring to FIGS. 1 to 3, the present embodiment provides a smart voice wake-up control device, which includes a casing 1, a main control board 2, a control switch 3, a voice pickup 4, a relay 5, an output terminal 6, an input terminal 7, and a work indicator capable of emitting a plurality of colors of light; the main control board 2 is connected to the control switch 3, the voice pickup 4, the relay 5, and the work indicator 8 respectively, and the relay 5 is connected to the output terminal 6 and the input terminal 7, respectively; the light color emitted by the working indicator light 8 corresponds to the color wake-up voice of the main control board 2.

The casing 1 includes a face shell 11 and a bottom cover 12 that matches the face shell 11. The input terminal 7 is a male terminal, and one end of the male terminal is fixed on the bottom cover 12. The output terminal 6 is a female terminal and the female terminal is fixed on the main control board 2. The face shell 11 is provided with a socket corresponding to the female jack terminal.

The control switch 3 is a touch switch and is located on a top surface of the face shell 11.

The main control board 2 includes an MCU and an AC/DC conversion module, a setting module, a voice module, a light control module, a switch control module, and a reminder module respectively connected to the MCU. The preferred model of the MCU is CI1103 voice AI chip. The reminder module is connected with a buzzer. In setting or controlling operations, the reminder module controls the buzzer to make a beep for feedback.

The face shell 11 is provided with a light hole 111, a sound hole 112, and an opening. The light hole 111 is used to show the light from the work indicator 8, and the sound hole 112 allows external sound to pass into the voice pickup 4, the opening allows the buzzer to transmit the buzzer sound out of the casing 1.

During operation, the control method of the smart voice wake-up control device is as follows:

(1) A user operates the control switch 3 to set a command light color. The colors can be red, green, blue, or yellow; in the present embodiment, only the foregoing four colors are used as examples; in other embodiments, other colors may also be included.

(2) The main control board 2 matches the corresponding color voice wake-up command according to the command light color; because there are four command light colors, there are four corresponding color voice wake-up command pre-stored in the MCU, including red voice wake-up command, green voice wake-up command, blue voice wake-up command, and yellow voice wake-up command.

(3) During operation, the MCU uses the light control module to control the work indicator 8 to continuously or blinkingly emit the command light color set in step (1); taking the setting of "red" as an example, the work indicator 8 emits red light, to conveniently remind the user that the wake-up command is a red voice wake-up command to avoid misoperation; when the voice pickup 4 receives the user's control voice command, the control voice command is converted into a voice signal by the voice module and fed back to the MCU for recognition.

(4) The MCU performs voice recognition on the voice signal. If the control voice command contains the corresponding color wake-up voice, the device will execute the output control command according to the user's control voice command; for example, when the user says "little red is on", "red red open", "red on" or "red color on", which include the voices of "red" and "on" or "off", the MCU makes the relay 5 turn on or off the loop between the output terminal 6 and the input terminal 7 through the switch control module to trigger other functional devices to respond accordingly; otherwise, the output control command is not executed. For example, when the user says "little green on", "green green on", "little yellow on" or "yellow on" and other voices without "red", the output control command is not executed.

When a plurality of smart voice wake-up control devices are used in the same room at the same time, for example, four smart voice wake-up control devices are used to control lightings at four different positions, when it is necessary to control the lighting at the first position, the user only needs to check the light color of the of the work indicator light 8 of the smart voice wake-up control device at the position, for example red, the lighting at the first position is a red voice wake-up command; when the lighting at the second position needs to be controlled, the work indicator light 8 of the smart voice wake-up control device at this position emits, for example, a yellow light, the command for controlling the lighting at that position is a yellow voice wake-up command; and so on. The present invention indicates the color wake-up voice by displaying the light color of the work indicator 8, so that the user can know the wake-up command intuitively, clearly and quickly to effectively solve the problem of misoperation or interference when a plurality of electrical products of the same or of different types are used simultaneously in the same space, which brings convenience to user's operation and effectively improves the user experience.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A smart voice wake-up control method, comprising the following steps:
    (1) Setting a command light color;
    (2) A main control board matching a corresponding color voice wake-up command according to the command light color;
    (3) During operation, the main control board controlling a work indicator to emit the command light color set in step (1), and at the same time receiving a user's control voice command through a voice pickup;
    (4) The main control board recognizing the user's control voice command; if the user's control voice command contains a corresponding color wake-up voice, executing an output control command according to the user's control voice command, and triggering other functional devices to respond;
    otherwise, not executing the output control command.

2. The smart voice wake-up control method according to claim 1, wherein the command light color includes red, green, blue, and yellow.

3. The smart voice wake-up control method according to claim 2, wherein the main control board matches the red, green, blue, and yellow colors of the command light with red voice wake-up commands, green voice wake-up commands, blue voice wake-up commands, yellow voice wake-up commands, and voice wake-up commands for other colors.

4. The smart voice wake-up control method according to claim 1, wherein the user's control voice command includes voices of red, green, blue, and yellow colors.

\* \* \* \* \*